R. B. Fitts,
Feed Bag.
Nº 33,737.   Patented Nov. 19, 1861.
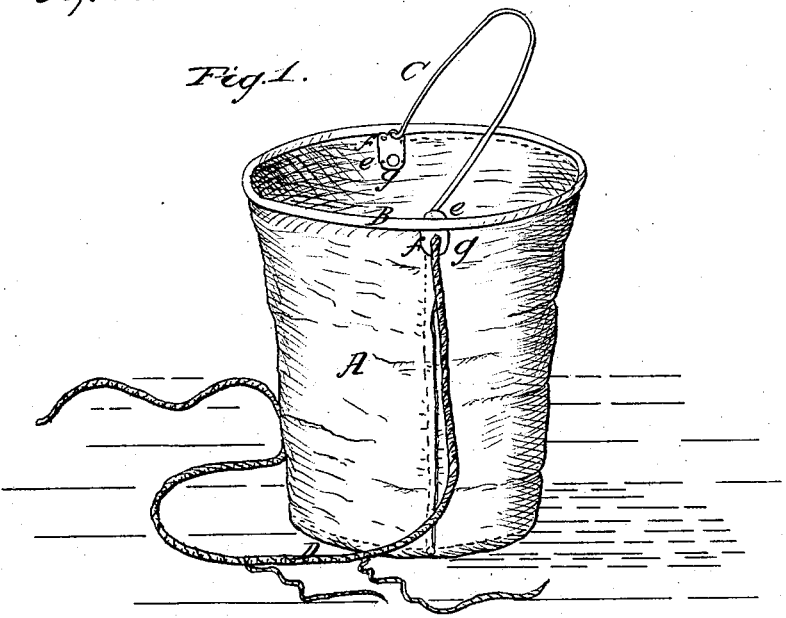
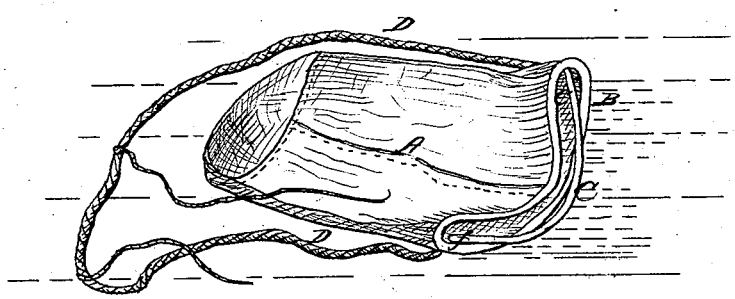
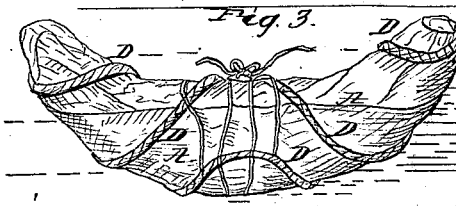
Witnesses   Inventor

United States Patent Office.

R. B. FITTS, OF PHILADELPHIA, PENNSYLVANIA.

IMPROVEMENT IN ARMY FEED AND WATER BUCKETS.

Specification forming part of Letters Patent No. 33,737, dated November 19, 1861.

*To all whom it may concern:*

Be it known that I, R. B. FITTS, of the city of Philadelphia, in the State of Pennsylvania, have invented a new and useful Improvement in Army Feed and Water Buckets; and I do hereby declare that the following is a full, clear, and exact description of the construction and operation of the same, reference being had to the accompanying drawings, making a part of this specification, in which—

Figure 1 is a perspective view of the bucket as opened out for use; Fig. 2, a like view of the same collapsed, and Fig. 3 a like view showing the bucket rolled into a compact condition for attaching to the rear of a saddle for transportation.

Like letters when on the different figures indicate the same parts.

This invention is an improvement in the army feed and water bucket for which Letters Patent were granted to me, dated the 17th day of September, 1861, and has for its object the rendering the same cheaper of construction, lighter, and free from any projecting points which would be likely to wound or hurt one's hand in using or transporting the same.

It consists in making the rim of the holder flexible and attaching the rigid bail thereto, so that it shall serve to keep the mouth of the holder properly open when the bucket is in use, as well as a means of carrying the same.

In the drawings, A is the holder; B, the flexible rim of the same; C, the rigid bail, and D a detachable cord or strap, whereby the vessel can be secured to a horse's head in feeding.

The holder A is made of waterproofed canvas, as heretofore; but instead of constructing it with a jointed metallic rim I substitute a filling of rope of, say, about half an inch diameter, securing its ends together and the canvas around it so as to produce a substantial rim, as seen in Fig. 1.

The bail C is made of rigid iron wire or round iron about one-eighth or a quarter-inch in diameter, and bent into a semicircle of about the same curve as will correspond with the semicircle formed by the rim B. The ends of the bail C are bent outward, so as to hook securely in a hole $e$ in each of two opposite sides of the holder A, just inside of its rim B, the said holes being strengthened at their boundaries by means of flat plates of metal $f\ f$, riveted fast on each side, as indicated in Fig. 1. Below the bail-holes $e\ e$ another hole $g$ is made through the plates on each side of the holder, whereby the head rope or strap D is secured, so that it can be detached readily, if desired.

Operation: When the vessel is used either for feeding or for carrying and holding water the bail C will keep it from collapsing or being drawn shut, and when it is desired to roll it up for transportation the holder is collapsed by pressing the rim together with it into the form shown in Fig. 2, thus adapting it for packing in small space for transportation, and when required to be secured behind a saddle, as in cavalry service, it can be rolled into the compact crescent form shown in Fig. 3, using the head cord or strap D for securing it to the saddle in that condition.

Having thus fully described my improvement and pointed out its utility, what I claim as new therein of my invention, and desire to secure by Letters Patent, is—

The flexible rim B, rigid bail C, and plates $f\ f$, the same being constructed and combined together with the flexible holder A, so as to operate together substantially in the manner described, and for the purposes specified.

R. B. FITTS.

Witnesses:
 BENJ. MORISON,
 I. W. THACKARA.